(12) United States Patent
Zhang et al.

(10) Patent No.: US 12,346,472 B2
(45) Date of Patent: Jul. 1, 2025

(54) AUTHORIZATION CHECKS AND AUDITING FOR QUERIES IN DATABASE SYSTEMS

(71) Applicant: SAP SE, Walldorf (DE)

(72) Inventors: Xun Zhang, Xi'an (CN); Taehyung Lee, Seoul (KR); Yinghua Ouyang, Xi'an (CN); Dongmei Xv, Xi'an (CN); Yanchen Cao, Xi'an (CN); Hong-Hai Do, Berlin (DE); Taeyoung Jeong, Seoul (KR); Zhen Tian, Xi'an (CN)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 18/180,221

(22) Filed: Mar. 8, 2023

(65) Prior Publication Data

US 2024/0303364 A1    Sep. 12, 2024

(51) Int. Cl.
*G06F 21/00* (2013.01)
*G06F 21/62* (2013.01)

(52) U.S. Cl.
CPC .. *G06F 21/6227* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 7,552,122 B1 * | 6/2009 | Georgiev | G06F 11/203 707/999.009 |
| 7,676,522 B2 | 3/2010 | Klein et al. | |
| 7,676,523 B2 | 3/2010 | Klein et al. | |
| 8,229,883 B2 | 7/2012 | Brauer et al. | |
| 8,346,819 B2 | 1/2013 | Do et al. | |
| 9,130,920 B2 * | 9/2015 | Pelykh | H04L 63/08 |
| 9,241,011 B2 * | 1/2016 | Tandon | H04L 63/20 |
| 9,280,569 B2 | 3/2016 | Do et al. | |
| 9,953,074 B2 * | 4/2018 | Farrar | G06F 9/52 |
| 10,133,778 B2 | 11/2018 | Lee et al. | |
| 10,303,686 B2 | 5/2019 | Lee et al. | |
| 10,545,984 B2 | 1/2020 | Zhang et al. | |
| 10,943,027 B2 | 3/2021 | Do et al. | |
| 10,997,174 B2 | 5/2021 | Song et al. | |
| 11,061,927 B2 | 7/2021 | Ouyang et al. | |
| 11,360,972 B2 | 6/2022 | Kim et al. | |
| 11,360,977 B2 | 6/2022 | Merx et al. | |
| 11,379,477 B2 | 7/2022 | Ouyang et al. | |
| 11,423,024 B2 | 8/2022 | Ouyang et al. | |
| 11,429,610 B2 | 8/2022 | Cheng et al. | |
| 11,468,062 B2 | 10/2022 | Sung et al. | |

(Continued)

*Primary Examiner* — Maung T Lwin
(74) *Attorney, Agent, or Firm* — Fish & Richardson P.C.

(57) ABSTRACT

1. Implementations of the present disclosure include receiving, by a database system, a query from an entity, providing a parse tree based on the query, the parse tree including nodes representative of operations to be executed and data objects stored within the database system, generating a module tree based on the parse tree, the module tree including a set of modules provided in sequential order from a root module to a leaf module, and executing an authorization check using the module tree by, for each module, determining a set of data objects and, for each data object in the set of data objects, determining whether the entity is one or more of authorized access the data object and perform an operation on the data object.

20 Claims, 5 Drawing Sheets

(56) References Cited

U.S. PATENT DOCUMENTS

| | | |
|---|---|---|
| 11,494,359 B2 | 11/2022 | Hao et al. |
| 11,972,012 B2 | 4/2024 | Ouyang |
| 12,135,713 B2 | 11/2024 | Ouyang |
| 2008/0282318 A1* | 11/2008 | Rits .................. G06Q 10/06 718/103 |
| 2018/0075252 A1* | 3/2018 | Rasmussen ........... H04L 9/0891 |
| 2018/0107832 A1 | 4/2018 | Ouyang et al. |
| 2018/0293276 A1 | 10/2018 | Bae et al. |
| 2019/0303614 A1 | 10/2019 | Do et al. |
| 2020/0151180 A1 | 5/2020 | Lee et al. |
| 2020/0192900 A1* | 6/2020 | Sung ..................... G06F 16/152 |
| 2020/0250328 A1* | 8/2020 | Swenson ............. G06F 21/6218 |
| 2020/0320069 A1 | 10/2020 | Jeong et al. |
| 2021/0226774 A1* | 7/2021 | Padmanabhan ....... H04L 9/0643 |
| 2022/0043830 A1* | 2/2022 | Mandadi ............. G06F 16/9024 |
| 2024/0152513 A1 | 5/2024 | Ouyang et al. |

\* cited by examiner

AUTHORIZATION CHECKS AND AUDITING FOR QUERIES IN DATABASE SYSTEMS

BACKGROUND

Database systems store data that can be queried. For example, a query can be submitted to a database system, which processes the query and provides a result. Queries are submitted in a query language. An example query language includes, without limitation, the structured query language (SQL), which can be described as a standard database language that is used to create, maintain and retrieve data stored in a relational database (e.g., a database, in which data is stored in relational tables). In some instances, queries can include multiple layers of nested sub-queries.

Access to and/or operations on data can be restricted. For example, users and/or applications can have access to some data and may be denied access to other data. As another example, and for data a user and/or application has access to, the types of operations allowed on the data can be restricted. In querying a database system, an authorization check is performed to ensure that a source of the query (e.g., a user and/or an application querying a database system) is authorized to access and/or operate on the data in response to the query. The authorization check is executed during processing of the query, prior to actual access to data in the database system.

SUMMARY

Implementations of the present disclosure include computer-implemented methods for querying database systems. More particularly, implementations of the present disclosure are directed to authorization checks and auditing for queries to database systems.

In some implementations, actions include receiving, by a database system, a query from an entity, providing a parse tree based on the query, the parse tree including nodes representative of operations to be executed and data objects stored within the database system, generating a module tree based on the parse tree, the module tree including a set of modules provided in sequential order from a root module to a leaf module, and executing an authorization check using the module tree by, for each module, determining a set of data objects and, for each data object in the set of data objects, determining whether the entity is one or more of authorized access the data object and perform an operation on the data object. Other implementations include corresponding systems, apparatus, and computer programs, configured to perform the actions of the methods, encoded on computer storage devices.

These and other implementations may each optionally include one or more of the following features: actions further include executing the query in the database system to provide a query result in response to determining that the entity is authorized access data objects and perform operations on data object for all modules in the set of modules; actions further include preventing execution of the query in the database system in response to determining that the entity is not authorized to access at least one data object for at least one module in the set of modules; actions further include, for at least one module in the set of modules, providing an audit entry in an audit log; an input object is processed for at least one module to provide an output object, the output object including an abstract result of the at least one module and being input to a parent module in the set of modules; actions further include providing a set of rules based on the modules, the set of rules being executed in a multi-phase traversal of the module tree; and the multi-phase traversal includes executing a top-down traversal of the module tree then a bottom-up traversal of the module tree.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
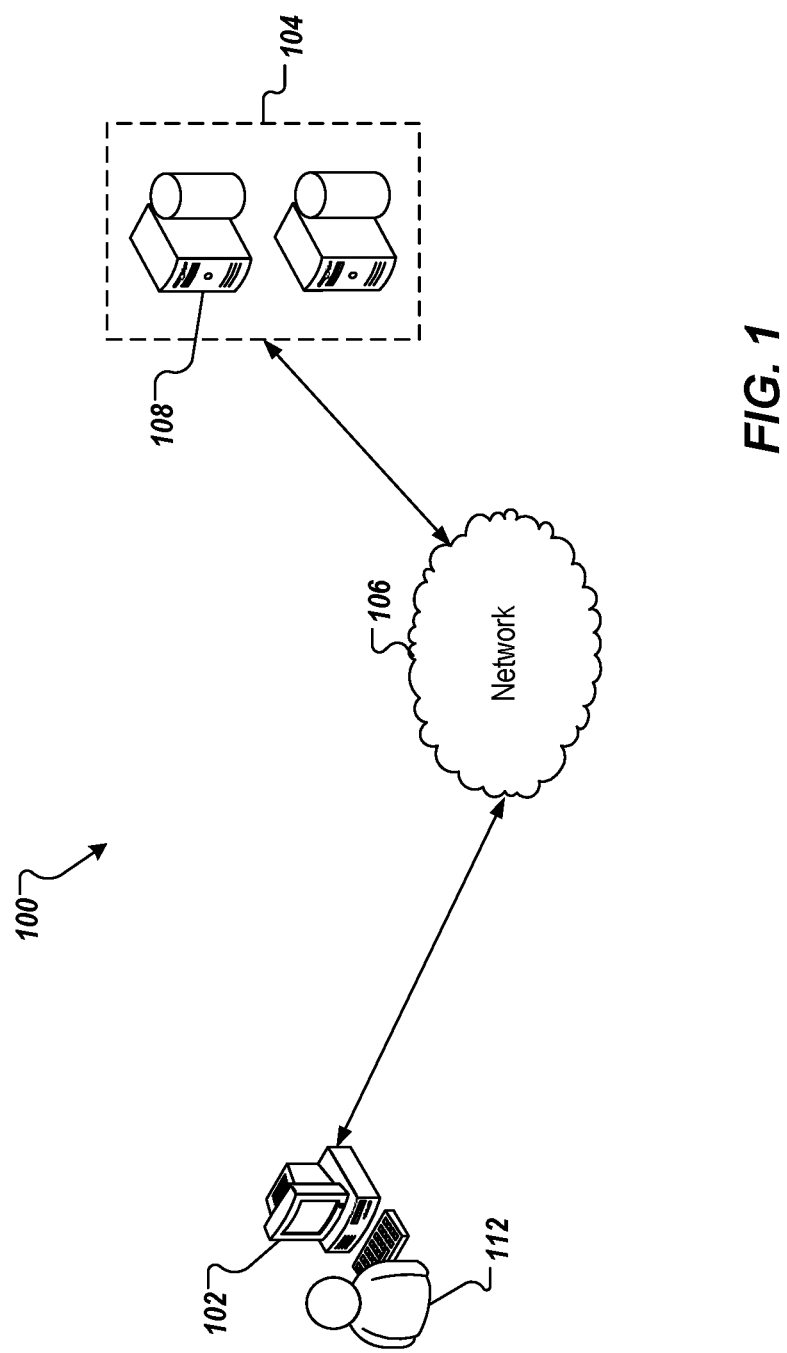
FIG. 1 depicts an example environment that can be used to execute implementations of the present disclosure.

Implementations of the present disclosure include computer-implemented methods for querying database systems. More particularly, implementations of the present disclosure are directed to authorization checks and auditing for queries to database systems. In some implementations, actions include receiving, by a database system, a query from an entity, providing a parse tree based on the query, the parse tree including nodes representative of operations to be executed and data objects stored within the database system, generating a module tree based on the parse tree, the module tree including a set of modules provided in sequential order from a root module to a leaf module, and executing an authorization check using the module tree by, for each module, determining a set of data objects and, for each data object in the set of data objects, determining whether the entity is one or more of authorized access the data object and perform an operation on the data object.

Implementations of the present disclosure are described in further detail with reference to an example query language. The example query language includes the structured query language (SQL) as the language that is used to query the database system. It is contemplated, however, that implementations of the present disclosure can be realized with any appropriate query language.

To provide further context for implementations of the present disclosure, and as introduced above, database systems store data that can be queried. For example, a query can be submitted to a database system, which processes the query and provides a result. Queries are submitted in a query language. An example query language includes, without limitation, SQL, which can be described as a standard database language that is used to create, maintain and retrieve data stored in a relational database (e.g., a database, in which data is stored in relational tables). In some instances, queries can include multiple layers of nested sub-queries.

Access to data can be restricted. For example, users and/or applications can have access to some data and may be denied access to other data. In querying a database system, an authorization check is performed to ensure that a source of the query (e.g., a user and/or an application querying a database system) is authorized to access data that may be returned in response to the query. The authorization check is executed during processing of the query, prior to actual access to data in the database system. Further, execution and attempted execution of queries are to be auditable by documenting such in an audit log. That is, auditing attempts to log all successful or unsuccessful queries on database objects by, for example, identifying each object and the access method attempted to each object for each query, which information is documented in the audit log.

In processing a query (e.g., a SQL query), the authorization check is performed during a semantics check. As described in further detail herein, the semantics check is performed to ensure that the semantics of the query matches the semantic of the database system. This is achieved by accessing a system catalog of the database system to obtain information associated with objects (e.g., tables, columns, views, procedures) implicated by the query. More particularly, a checker object is created for the query to collect information on catalog objects for each node in an abstract syntax tree (AST) that is generated by parsing the query. A checker object can be described as a transient data object that stores collected database catalog objects and their respective authorization types for subsequent authorization. After authorization is finished, the checker object is freed. The checker object adds information on collected objects to an authorization list. Example information can include, without limitation, for each entity, one or more roles that are authorized to access or execute an operation on the respective object. For the authorization check, a security application programming interface (API) is invoked by passing the authorization list as a parameter. If the entity that issued the query is authorized to access the object and execute the operation, the query is executed. If the entity that issued the query is not authorized to access the object or execute the operation, the query is not executed (e.g., an error is returned).

Database systems have many kinds of objects and operators (e.g., table, view, function, select, delete, update). As such, how to ensure operations and objects have been authorized and log for auditing are important aspects to consider in database systems. Traditional approaches to authorization and auditing go through objects and operations one by one and, as such, can be described as mixed and disorderly. This complicates the the authorization and auditing processes, as well as results in inefficient use of resources. Further, if new objects or operations are introduced and are not accounted for in authorization and auditing logs, potential security holes make the database system vulnerable. For example, logic for new syntax must be coded and all objects implicated by the new syntax must be manually performed. Development must take care to avoid missed or incorrect logic, which could result in security vulnerabilities and/or bugs in the database system.

In view of the foregoing, and as described in further detail herein, implementations of the present disclosure are directed to an authorization check and auditing system for querying database systems. As described in further detail herein, the authorization check and auditing system of the present disclosure uses the AST of a query to provide a module tree that corresponds to authorization operations, where modules in the module tree are isolated from one another. In some examples, a rule engine sequentially invokes auditing and authorization rules based on the modules. As described in detail herein, the authorization check and auditing system of the present disclosure obviates issues of traditional approaches in handling new syntax and/or objects and avoids potential security issues.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host a database system. In some examples, the database system is a database management system (DBMS), also referred to as database system herein, that stores data in relational tables (e.g., as a relational database). The database system can be provided as an in-memory database system that uses main memory for data storage. Main memory may include one or more types of random-access memory (RAM) that communicates with one or more processors, e.g., CPU(s), over memory bus. An in-memory database system may be contrasted with database management systems that employ a disk storage mechanism. In some examples, in-memory database systems may be faster than disk storage databases, because internal optimization algorithms may be simpler and execute fewer CPU instructions. In some examples, accessing data in an in-memory database system may reduce or eliminate seek time when querying the data, providing faster and more predictable performance than disk-storage databases. An in-memory database may include a row-oriented database, in which data is stored in any number of rows or records. An in-memory database may also include a column-oriented in-memory database, in which data tables are stored as sections of columns of data (rather than as rows of data). An example in-memory database system is HANA provided by SAP SE of Walldorf, Germany.

In some examples, the database system can be queried by submitting a query to the database system, which processes the query to provide a query result. Queries can be submitted by entities, non-limiting examples of which can include users and applications. For example, the user 112 can access the database system using a client interface (e.g., open database connectivity (ODBC), Java database connectivity (JDBC), hypertext transfer protocol (HTTP)) through the client device 102.

In some examples, the ability of an entity to access and/or perform database operations on database objects stored within the database system is determined by the privileges that the entity has been granted. Example database operations can include reading (e.g., read data from a table), writing (e.g., writing data to a table), and modifying (e.g., modifying data within a table). In some examples, privileges granted to a user are granted through assigning the user to one or more roles, and each role can include defined operations that can be performed. Objects within the database system can also each be associated with one or more roles. If the user has a role that matches a role assigned to the object, the user is authorized to perform defined operations on the object. Accordingly, each time a user tries to perform an operation on an object (e.g., by submitting a query), the database system performs an authorization check on the user. As introduced above, in some examples, the authorization check is performed during a semantics check of the query during query processing.

Figure 2:
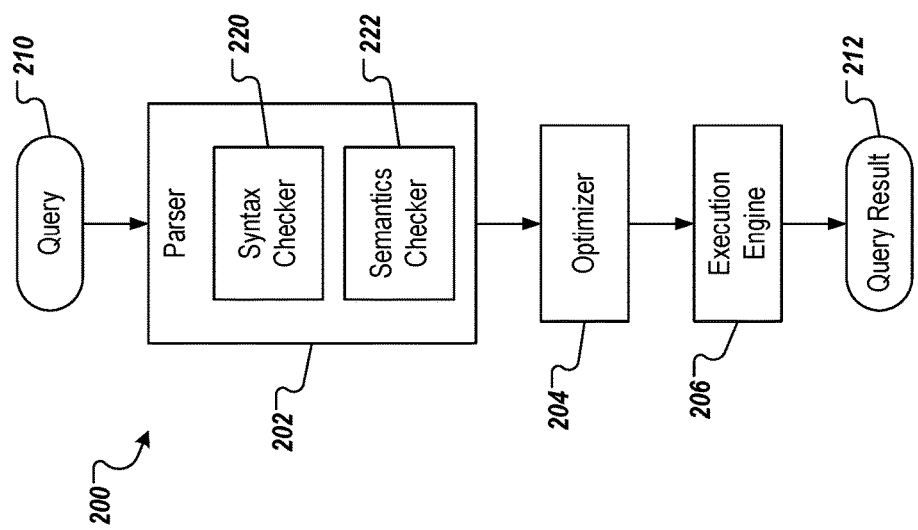
FIG. 2 depicts an example conceptual architecture in accordance with implementations of the present disclosure.

FIG. 2 depicts an example conceptual architecture 200 in accordance with implementations of the present disclosure. The example conceptual architecture 200 is representative of a query processing system within a database system. In the example of FIG. 2, the conceptual architecture 200 includes a parser 202, an optimizer 204, and an execution engine 206, each of which can be provided as one or more computer-executable programs. A query 210 is processed to provide a query result 212. The query result 212 includes data stored within the database system, the data being responsive to the query 210. For example, the following example query results in data being read from a column (with field name A) a table (with table name T) and returned as a query result:
select A from T In further detail, the parser 202 includes a syntax checker 220 and a semantics checker 222. In some examples, the parser 202 parses the query to define a data structure that enables further processing. In some examples, the data structure is an AST, which can be described as a tree representation of the abstract syntactic structure of the query written in a query language (e.g., SQL). The syntax checker 220 processes the query to ensure that the query is syntactically correct (e.g., conforms to rules for syntactically correct queries). For example, the following statement would fail the syntax check, because the keyword from is misspelled:
select A form T The semantics checker 222 processes the query to ensure that the query is semantically correct. The semantics check can generally be described as determining whether a statement is meaningful in terms of what is being requested from the database system. That is, for example, whether the objects (e.g., tables, columns, views, procedures) in the statement actually exist within the database system. For example, and with reference to the example statement above, the statement would fail the semantic check, if the database system does not have a table with table name T stored therein and/or, if the table with the table T does not include a column with the column name A. In some examples, the semantics check is performed using a checker object that collects information regarding objects (e.g., tables, columns, views, procedures) implicated by the query from a system catalog of the database system. In general, an object is implicated by the query if an operation (e.g., read, write) is to be performed on the object through execution of the query. In general, the system catalog records all objects (e.g., tables, columns, views, procedures) maintained within the database system and information associated therewith. Example information can include, without limitation, a set of roles that are assigned to the object, each role defining operations that can be performed on the object.

In some examples, if the system catalog does not include an object requested by the checker object, the semantic check fails, and an error is returned. For example, and with reference to the example query above, if the database system does not have a table with table name T stored therein, the system catalog is absent a record indicating a table with table name T. In this case, a semantic error is returned, which indicates that the table does not exist in the database system. On the other hand, if the database system does have a table with table name T stored therein, the system catalog includes a record indicating a table with table name T. In this case, the semantic check (at least for this particular object) is passed and information associated with the object (e.g., a set of roles) is returned. In some examples, for queries that implicate multiple objects, information associated with each object is returned. For example, a first set of roles is returned for a first object and a second set of roles is returned for a second object.

In some examples, the semantics checker 222 also performs an authorization check. For example, the checker object provides an authorization list that is included as a parameter of a call to a security API. The authorization list contains each object (provided from the system catalog) and its authorization type (e.g., for the example query select A from T, the authorization list contains table T and its authorization type select as well as column A). The security API processes the authorization list and provides an authorization result that indicates whether the entity (e.g., user) that submitted the query is authorized to access the data that would be returned by the query. For example, and with reference to the example query above, a security component checks whether the current entity (e.g., user, application) has select privilege on table T and column A, if yes authorization check passes otherwise it fails with an error (e.g., insufficient privilege). In some examples, the authorization list that includes a superset of roles. The superset of roles can include the sets of roles returned for objects implicated by the query. For example, and with reference to the example above, a superset of roles can include the first set of roles associated with the first object and the second set of roles associated with the second object.

If the syntax check, the semantics check, and the authorization check are all passed (i.e., there is no syntax error, there is no semantics error, there is no authorization error), the AST of the query is provided to the optimizer 204, which provides a query execution plan (QEP). In some examples, the QEP is a list of programmatic instructions that are to be executed to provide the query result 212. In some examples, the QEP includes a number of operations, which can include, for example and without limitation, read and write operations. In general, the QEP defines the sequence in which tables are accessed, methods used to extract data from each table, and methods for computing calculations, filtering, aggregating, and/or sorting data from each table. In some examples, multiple QEPs could be executed to provide the query result 212. However, the optimizer 204 outputs the QEP that is determined to be optimal (e.g., in terms of computing resources and memory expended to execute the QEP) among the multiple QEPs. The execution engine 206 executes the QEP provided by the optimizer 204 to provide the query result.

As introduced above, implementations of the present disclosure are directed to executing authorization checks and auditing for queries submitted to database systems. For purposes of illustration, and without limitation, an example query is referenced herein. It is contemplated that implementations of the present disclosure can be realized with any appropriate query.

Figure 3:
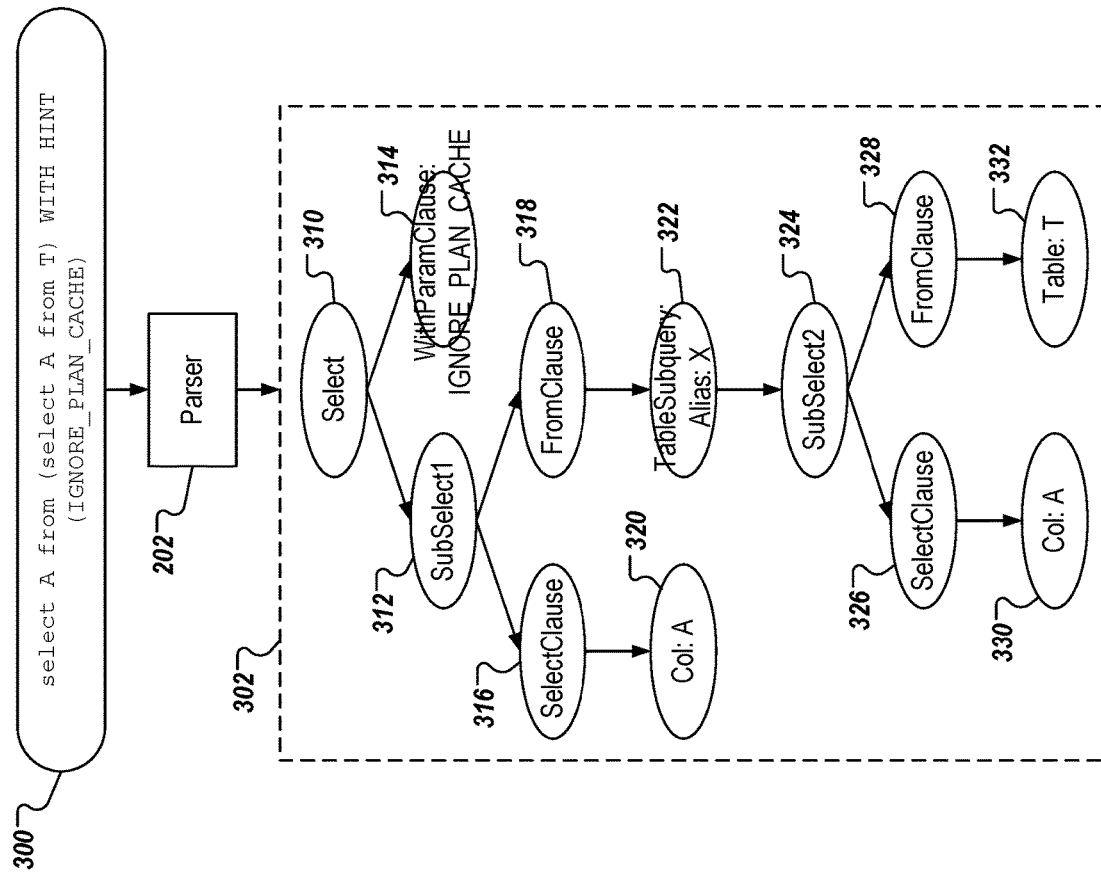
FIG. 3 depicts an example representation associated with a query having nested sub-queries.

FIG. 3 depicts an example representation associated with a query 300. Here, the non-limiting example query 300 is provided as:

select A from (select A from T) WITH HINT (IGNORE_PLAN_CACHE)

The example query 300 is parsed by the parser 202 to provide an AST. For purposes of illustration, the example of FIG. 3 depicts the AST as a high-level parse tree 302. In the example of FIG. 3, the high-level parse tree 302 includes a root node 310 and child nodes 312, 314, 316, 318, 320, 322, 324, 326, 328, 330 (nodes 312, 316, 318, 322, 324, 326, 328 being intermediate (parent/child) nodes, and nodes 314, 320, 330, 332 being leaf (child) nodes).

Figure 4:
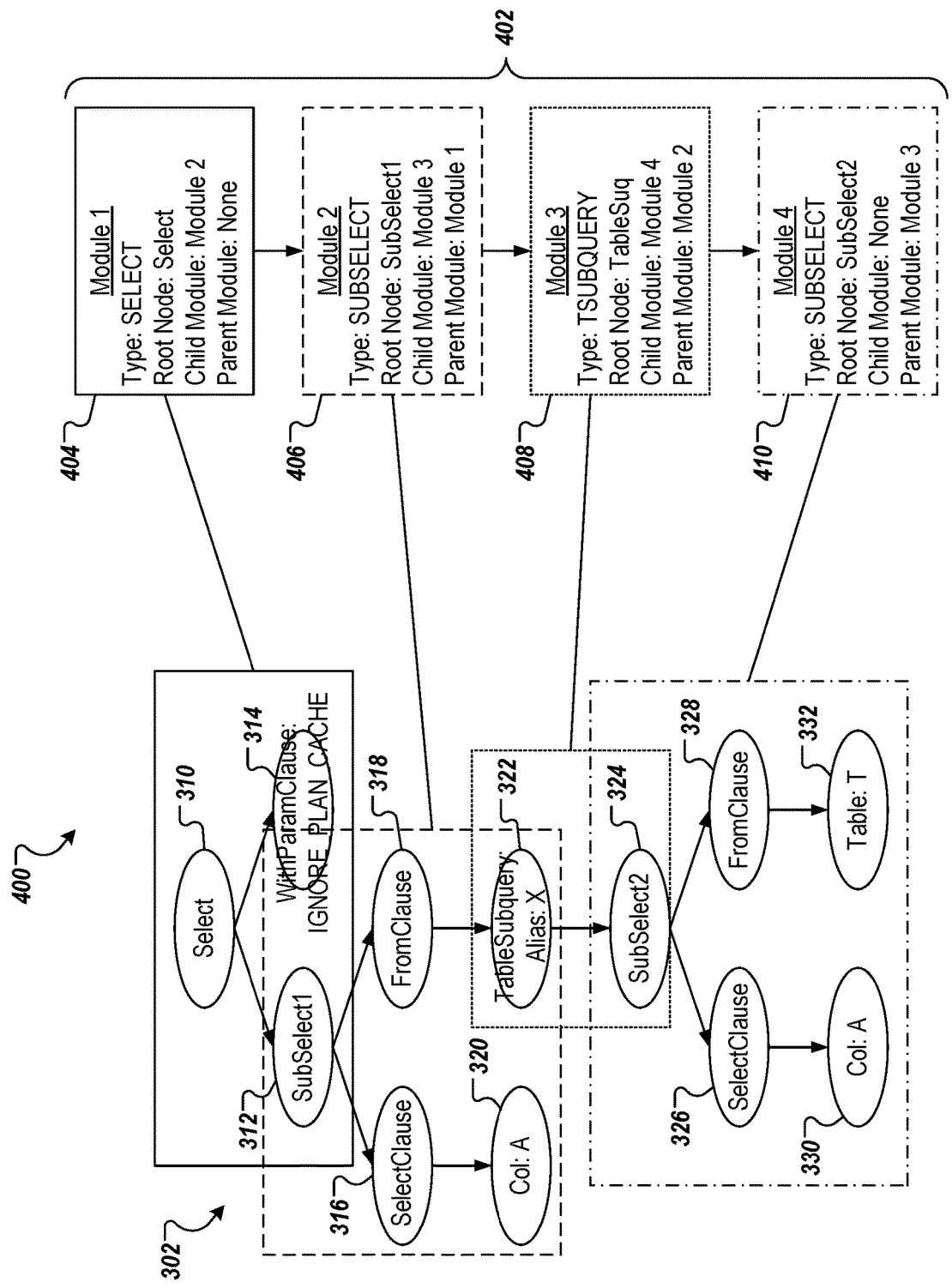
FIG. 4 depicts a conceptual representation of executing authorization checks on queries having nested sub-queries in accordance with implementations of the present disclosure.

In accordance with implementations of the present disclosure, for authorization checks and auditing on queries, a module tree is provided from the AST. FIG. 4 depicts a representation of an example modularization 400 of the example parse tree 302 of FIG. 3. In the example of FIG. 4, a module tree 402 is provided. In the example of FIG. 4, the module tree 402 includes modules 404, 406, 408, 410. It is contemplated, however, that module trees of the present disclosure can have any appropriate number of modules (e.g., tens, hundreds, thousands).

In some implementations, modules are determined based on operations encountered as a parse tree is traversed from root node to lead nodes. In some examples, for each operation that is encountered, a module is defined. For example, and with reference to the example of FIG. 4, the root node 310, being a SELECT operation, defines the module 404. As the parse tree 302 is traversed toward leaf nodes, the intermediate node 312 is encountered and, being a SUBSE-LECT operation, defines the module 406. This process continues down the parse tree 302 to define the modules 408, 410.

As described in further detail herein, the module tree is processed for authorization checks and auditing. For example, during checking each module generates an output object and propagates the output object to a parent module in the module tree. In some examples, each output object is based on an input object that defines metadata visibility for the respective module. For example, and with non-limiting reference to the module tree 402 of FIG. 4, the following input objects and output objects can be provided:

TABLE 1

Example Input Objects and Output Objects

| Module | Input Object | Output Object |
|---|---|---|
| 1 | {Name: X, Type: Internal, Columns: [A Integer]} | None |
| 2 | {Name: X, Type: Internal, Columns: [A Integer]} | {Name: X, Type: Internal, Columns: [A Integer]} |
| 3 | {Name: None, Type: Internal, Columns: [A Integer]} | {Name: X, Type: Internal, Columns: [A Integer]} |
| 4 | {Name: T, Type: Table, Columns: [A Integer]} | {Name: None, Type: Internal, Columns: [A Integer]} |

In some examples, each object corresponds to data that is implicated for access and/or operation execution by the query. As described in further detail herein, authorization checks can be processed on a module-by-module basis based on the objects. If a module fails authorization, an error message is sent and the query is not executed. If a module passes authorization, an audit log entry is made for the respective model and data objects. If all modules pass authorization, the query is executed. In some examples, the audit log entry includes, without limitation, an audit action and related information (e.g., schema, database, object, username) for performing the audit action. For example, for the query select col1 from T1, the audit action is SELECT, and database, schema, tablename, and username are provided as the related information.

In some implementations, the module tree is traversed in two phases: top-down (e.g., from the root node down) and bottom-up (e.g., from the leaf node up). In some examples, a set of rules is determined from a rule map based on a type of the current module being considered and the traversal phase (e.g., top-down, bottom-up). For the current module, the rules in the set of rules are executed based on an input object to provide an output object for the current module. In some examples, each rule is specific to a function (operation) of a respective module. For example, and without limitation, a rule can include checking whether tables and/or columns exist in the database system. In some examples, rules are predefined for each type of modules.

In some examples, rule execution uses the multi-phase travesal process introduced above. In some examples, the first traversal can be described as a prepare phase, top-down travsal, from the root module to the leaf module. In the first phase, input/output objects of each module are prepared. For example, in the module tree 402 of FIG. 4, check table T and column A are provided. The second phase can be described as a run phase that includes a bottom-up traversal, from leaf node to root node, and uses the input/output objects to execute specific functionality defined by the rule. For example, in the module tree 402 of FIG. 4, add audit entry (SELECT action) is provided for the module 410. However, the root node modules (e.g., the module 404 of FIG. 4) do not have output objects.

Figure 5:
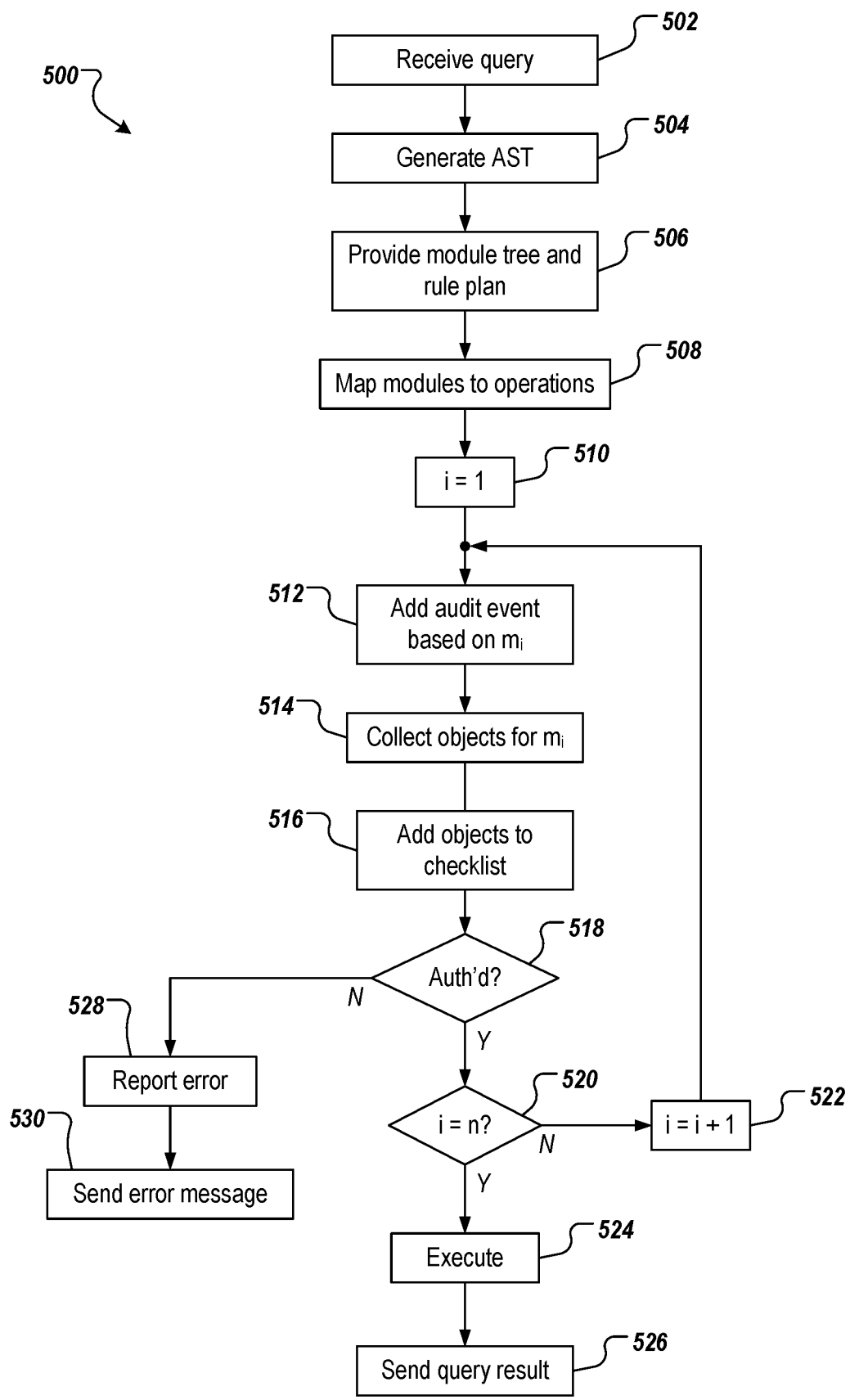
FIG. 5 depicts an example process that can be executed in accordance with implementations of the present disclosure.

FIG. 5 depicts an example process 500 that can be executed in accordance with implementations of the present disclosure. In some implementations, the example process 500 may be performed using one or more computer-executable programs executed using one or more computing devices.

A query is received (502). For example, and as described in detail herein, the parser 202 of FIG. 2 receives the query 210. An AST is generated (504). For example, and as described in detail herein, the parser 202 provides an AST as a parse tree, such as the parse tree 302 of FIGS. 3 and 4. A module tree and rule plan are provided (506). For example, and as described in detail herein, the parser provides a module tree, such as the module tree 402 of FIG. 4. In some examples, the module tree can include modules $m_1 \ldots, m_n$. In some examples, the rule plan includes the set of rules, each rule being specific to the operations of the modules.

Modules are mapped to operations (508). For example, and as described in detail herein, each module in the module tree implicates one or more operations. In the example of FIG. 4, the module 404 is mapped to the operations SELECT and SUBSELECT1. A counter i is set equal to 1 (510). An audit event is added based on module $m_i$ (512). For example, and as described in detail herein, an audit entry is made to an audit log for the module $m_i$. Objects are collected for module $m_i$ (514) and are added to a checklist (516). For example, and as described in detail herein, the objects (e.g., column A of table T) implicated based on the operations of the module $m_i$ are determined. It is determined whether the entity is authorized to access and/or perform operations on the object(s) (518). For example, and as described in detail herein, authorization information of the entity that submitted the query is cross-checked with authorization information provided for each object in the checklist. In some examples, an entity, such as a user, can be associated with a role and the object can be associated with a set of authorized roles for access to the object and/or operations on the object.

If the entity is authorized to access and/or perform operations on the objects, it is determined whether i is equal to n (520). That is, it is determined whether all modules have been considered. If i is not equal to n, i is incremented and the example process 500 loops back. If i is equal to n, the query is executed (524) and a query result is sent (526). For example, and as described in detail herein, the query result is sent to the entity that had submitted the query. If the entity is not authorized to access and/or perform operations on the objects, an error is reported (528) and an error message is sent (530). For example, and as described in detail herein, an error message is sent to the entity that had submitted the query to inform that the query cannot be executed (e.g., a message indicating that the entity is not authorized to execute the query).

Figure 6:
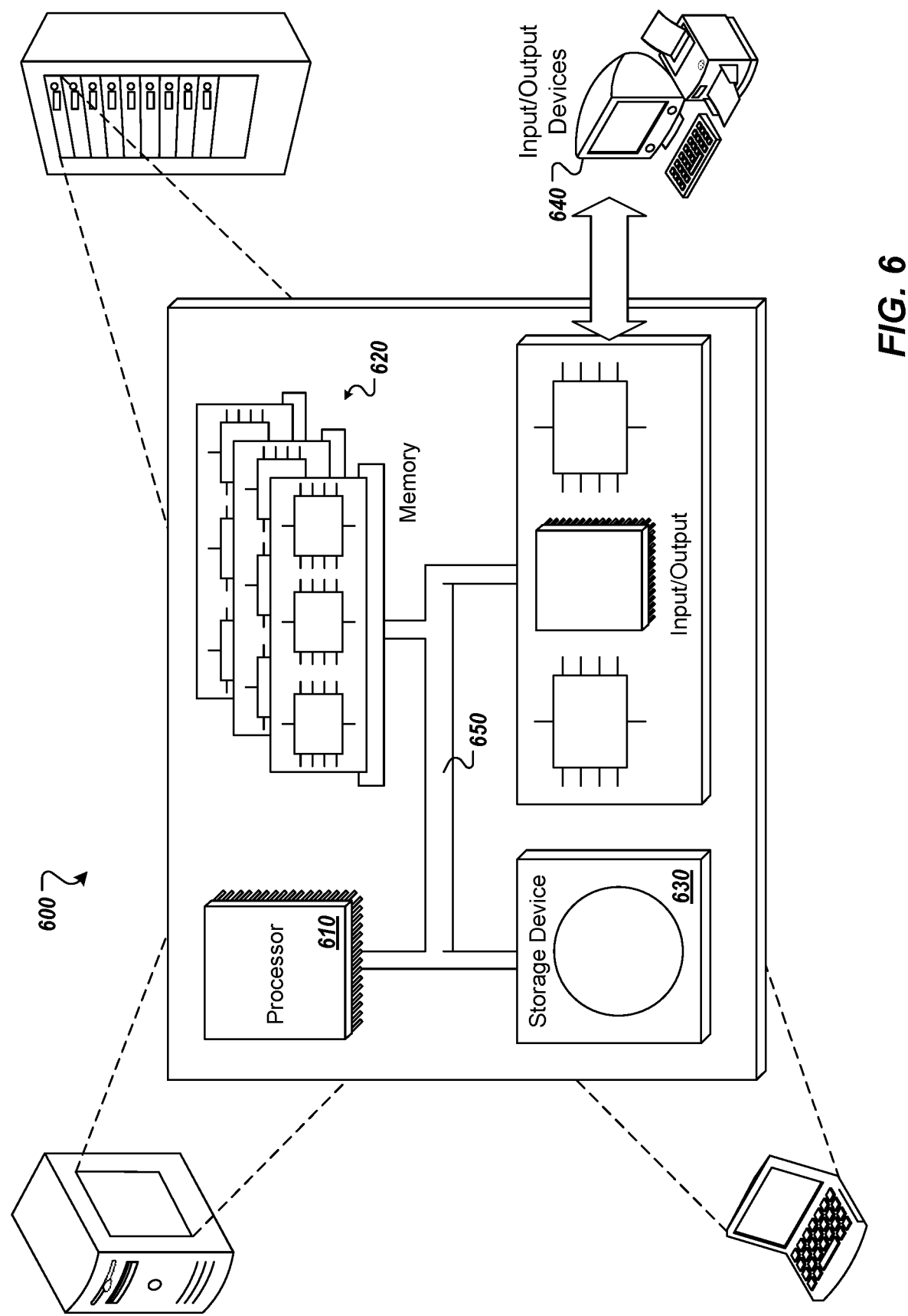
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a solid-state storage device, a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (e.g., one or more modules of computer program instructions, encoded on a computer program carrier) for execution by, or to control the operation of, data processing apparatus. The carrier may be a tangible non-transitory computer storage medium. Alternatively, or in addition, the carrier may be an artificially-generated propagated signal (e.g., a machine-generated electrical, optical, or electromagnetic signal) that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry (e.g., an FPGA (field programmable gate array), an ASIC (application-specific integrated circuit), or a GPU (graphics processing unit)). The apparatus can also include, in addition to hardware, code that creates an execution environment for computer programs (e.g., code that constitutes processor firmware, a protocol stack, a database management system, an operating system, or a combination of one or more of them).

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data (e.g., one or more scripts) stored in a markup language document, in a single file dedicated to the program in question, or in multiple coordinated files (e.g., files that store one or more modules, sub-programs, or portions of code).

The processes and logic flows described in this specification can be performed by one or more computers executing one or more computer programs to perform operations by operating on input data and generating output. The processes and logic flows can also be performed by special-purpose logic circuitry (e.g., an FPGA, an ASIC, or a GPU) or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

To provide for interaction with a user, implementations of the subject matter described in this specification can be implemented on, or configured to communicate with, a computer having a display device (e.g., a LCD (liquid crystal display) monitor, a LED (light-emitting diode) monitor, a OLED (organic LED) monitor) for displaying information to the user, and an input device by which the user can provide input to the computer (e.g., a keyboard) and a pointing device (e.g., a mouse, a trackball or touchpad). Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device (e.g., a smartphone, electronic tablet). Also, a computer can interact with a user by sending text messages or other forms of message to a personal device (e.g., a smartphone that is running a messaging application) and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable sub-combination. Moreover, although features may be described above as acting in certain combinations and even initially be claimed as such, one or more features from a claimed combination can in some cases be excised from the combination, and the claim may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for authorization checks of queries in database systems, the method being executed by one or more processors and comprising:
   receiving, by a database system, a query from an entity;
   providing a parse tree based on the query, the parse tree comprising nodes representative of operations to be executed and data objects stored within the database system;
   generating a module tree based on the parse tree, the module tree comprising a set of modules provided in sequential order from a root module to a leaf module, each module overlapping another module and representing portions of multiple paths through the parse tree; and executing an authorization check using the module tree by, for each module, determining a set of data objects and, for each data object in the set of data objects, determining whether the entity is one or more of authorized access the data object and perform an operation on the data object.

2. The method of claim 1, further comprising executing the query in the database system to provide a query result in response to determining that the entity is authorized access data objects and perform operations on data object for all modules in the set of modules.

3. The method of claim 1, further comprising preventing execution of the query in the database system in response to determining that the entity is not authorized to access at least one data object for at least one module in the set of modules.

4. The method of claim 1, further comprising, for at least one module in the set of modules, providing an audit entry in an audit log.

5. The method of claim 1, wherein an input object is processed for at least one module to provide an output object, the output object comprising an abstract result of the at least one module and being input to a parent module in the set of modules.

6. The method of claim 1, further comprising providing a set of rules based on the modules, the set of rules being executed in a multi-phase traversal of the module tree.

7. The method of claim 6, wherein the multi-phase traversal comprises executing a top-down traversal of the module tree then a bottom-up traversal of the module tree.

8. A non-transitory computer-readable storage medium coupled to one or more processors and having instructions stored thereon which, when executed by the one or more processors, cause the one or more processors to perform operations for authorization checks of queries in database systems, the operations comprising:
receiving, by a database system, a query from an entity;
providing a parse tree based on the query, the parse tree comprising nodes representative of operations to be executed and data objects stored within the database system;
generating a module tree based on the parse tree, the module tree comprising a set of modules provided in sequential order from a root module to a leaf module, each module overlapping another module and representing portions of multiple paths through the parse tree; and
executing an authorization check using the module tree by, for each module, determining a set of data objects and, for each data object in the set of data objects, determining whether the entity is one or more of authorized access the data object and perform an operation on the data object.

9. The non-transitory computer-readable storage medium of claim 8, wherein operations further comprise executing the query in the database system to provide a query result in response to determining that the entity is authorized access data objects and perform operations on data object for all modules in the set of modules.

10. The non-transitory computer-readable storage medium of claim 8, wherein operations further comprise preventing execution of the query in the database system in response to determining that the entity is not authorized to access at least one data object for at least one module in the set of modules.

11. The non-transitory computer-readable storage medium of claim 8, wherein operations further comprise, for at least one module in the set of modules, providing an audit entry in an audit log.

12. The non-transitory computer-readable storage medium of claim 8, wherein an input object is processed for at least one module to provide an output object, the output object comprising an abstract result of the at least one module and being input to a parent module in the set of modules.

13. The non-transitory computer-readable storage medium of claim 8, wherein operations further comprise providing a set of rules based on the modules, the set of rules being executed in a multi-phase traversal of the module tree.

14. The non-transitory computer-readable storage medium of claim 13, wherein the multi-phase traversal comprises executing a top-down traversal of the module tree then a bottom-up traversal of the module tree.

15. A system, comprising:
a computing device; and
a computer-readable storage device coupled to the computing device and having instructions stored thereon which, when executed by the computing device, cause the computing device to perform operations for authorization checks of queries in database systems, the operations comprising:
receiving, by a database system, a query from an entity;
providing a parse tree based on the query, the parse tree comprising nodes representative of operations to be executed and data objects stored within the database system;
generating a module tree based on the parse tree, the module tree comprising a set of modules provided in sequential order from a root module to a leaf module, each module overlapping another module and representing portions of multiple paths through the parse tree; and
executing an authorization check using the module tree by, for each module, determining a set of data objects and, for each data object in the set of data objects, determining whether the entity is one or more of authorized access the data object and perform an operation on the data object.

16. The system of claim 15, wherein operations further comprise executing the query in the database system to provide a query result in response to determining that the entity is authorized access data objects and perform operations on data object for all modules in the set of modules.

17. The system of claim 15, wherein operations further comprise preventing execution of the query in the database system in response to determining that the entity is not authorized to access at least one data object for at least one module in the set of modules.

18. The system of claim 15, wherein operations further comprise, for at least one module in the set of modules, providing an audit entry in an audit log.

19. The system of claim 15, wherein an input object is processed for at least one module to provide an output object, the output object comprising an abstract result of the at least one module and being input to a parent module in the set of modules.

20. The system of claim 15, wherein operations further comprise providing a set of rules based on the modules, the set of rules being executed in a multi-phase traversal of the module tree.

* * * * *